(12) United States Patent
Cho

(10) Patent No.: US 8,393,151 B2
(45) Date of Patent: Mar. 12, 2013

(54) FLOW RATE CONTROL DEVICE OF HYDRAULIC PUMP IN POWER STEERING SYSTEM

(75) Inventor: Seungbum Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 887 days.

(21) Appl. No.: 12/537,944

(22) Filed: Aug. 7, 2009

(65) Prior Publication Data

US 2010/0154402 A1    Jun. 24, 2010

(30) Foreign Application Priority Data

Sep. 9, 2008    (KR) .................... 10-2008-0088589

(51) Int. Cl.
*F16D 31/02*    (2006.01)
*F01B 9/00*    (2006.01)
*F01C 20/18*    (2006.01)

(52) U.S. Cl. ............................... 60/452; 92/136; 418/26

(58) Field of Classification Search .................... 60/452; 92/13.4, 13.7, 13.8, 136; 417/218, 221; 418/23–26, 418/29–31

See application file for complete search history.

(56) References Cited

U.S. PATENT DOCUMENTS

| | | | | |
|---|---|---|---|---|
| 2,426,491 A | * | 8/1947 | Dillon | 418/24 |
| 2,716,946 A | * | 9/1955 | Hardy | 60/452 |
| 2,880,677 A | * | 4/1959 | Grupen | 418/23 |
| 3,379,006 A | * | 4/1968 | Eickmann | 60/452 |
| 4,659,297 A | * | 4/1987 | Kahrs | 418/25 |

FOREIGN PATENT DOCUMENTS

| | | |
|---|---|---|
| JP | 4-194389 A | 7/1992 |
| JP | 5-018370 A | 1/1993 |
| JP | 6-200882 A | 7/1994 |
| JP | 7-267118 A | 10/1996 |
| JP | 2007-9695 A | 1/2007 |

* cited by examiner

*Primary Examiner* — Michael Leslie
(74) *Attorney, Agent, or Firm* — Morgan, Lewis & Bockius LLP

(57) ABSTRACT

A flow rate control device of a hydraulic pump in a power steering system, may include an upper cam ring having a cam profile, which is fixedly installed, a lower cam ring having a cam profile, which is engaged with the upper cam ring to be relatively rotatable about the upper cam ring, and a rotor including a plurality of vanes and engaged with the upper and lower cam rings to form an inner space therebetween to pressurize oil by protruding the vanes in the inner space by centrifugal force while rotating.

3 Claims, 7 Drawing Sheets

LOWER CAM RING ROTATES AT 30 DEGREES

LOWER CAM RING ROTATES AT 60 DEGREES

LOWER CAM RING ROTATES AT 90 DEGREES

FLOW RATE CONTROL DEVICE OF HYDRAULIC PUMP IN POWER STEERING SYSTEM

CROSS-REFERENCE TO RELATED APPLICATIONS

The present application claims priority to Korean Application Serial Number 10-2008-0088589, filed on Sep. 9, 2008, the entire contents of which is incorporated herein for all purposes by this reference.

BACKGROUND OF THE INVENTION

1. Field of the Invention

The present invention relates to a hydraulic pump in a power steering system, and more particularly, to a flow rate control device of a hydraulic pump in a power steering system, which can improve handling stability of a vehicle by reducing a flow rate discharged from the hydraulic pump when the vehicle is driven at high speed.

2. Description of Related Art

A known power steering system of a vehicle is a system that assists driver's handling force of a steering handle by using oil pressure. The oil pressure is generated by a flow rate discharged from a hydraulic pump.

A rotor having a plurality of centrifugal vanes is rotatably installed in a cam ring that is fixedly installed and when the rotor rotates by receiving rotation force of an engine, the vein projects by receiving centrifugal force, thereby changing the volume of a space between the cam ring and the rotor. Therefore, the hydraulic pump discharges fluid by a different in pressure.

However, the hydraulic pump is connected to the engine to be driven by receiving the rotation force of the engine, such that a fuel ratio of the engine is deteriorated. As the hydraulic pump is connected to the engine so that a rotation speed of the engine is the same as that of the hydraulic pump, a vehicle is driven at high speed, thus, the rotation speed of the engine increases and the hydraulic pump is operated at high speed. At this time, the flow rate discharged from the hydraulic pump increases and thus the oil pressure is also raised.

Accordingly, when the vehicle is driven at high speed, the oil pressure discharged from the hydraulic pump also increases, thereby assisting the handling force of a steering handle by the increased oil pressure at the time of handling the steering handle. As a result, a handling feeling of the steering handle becomes lighter, such that the handling stability of the vehicle deteriorates.

In order to solve the above-described disadvantage, the deterioration of the fuel ratio may be improved by adopting a variable capacity type hydraulic pump having a structure in which a cam moves by the internal pressure of the hydraulic pump, but in this case, manufacturing cost increases and the NVH performance of the vehicle deteriorates due to a complicated structure.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a flow rate control device of a hydraulic pump in a power steering device in which a vehicle is driven at high speed, such that a rotation speed of an engine increases and thus the hydraulic pump is operated at high speed, whereby oil pressure and flow rate discharged from the hydraulic pump increase, as a result, handling assisting power of the steering handle increase and when handling stability deteriorates, thereby improving the handling stability of the steering handle by properly decreasing the oil pressure and the flow rate discharged from the hydraulic pump to reduce the handling assisting power of the steering handle, and decreasing a weight and manufacturing cost of a vehicle by a simple structure.

In an aspect of the flow rate control device of a hydraulic pump in a power steering system, may include an upper cam ring having a cam profile, which is fixedly installed, a lower cam ring having a cam profile, which is engaged with the upper cam ring to be relatively rotatable about the upper cam ring, and a rotor including a plurality of vanes and engaged with the upper and lower cam rings to form an inner space therebetween to pressurize oil by protruding the vanes in the inner space by centrifugal force while rotating.

The cam profiles of the upper cam ring and the lower cam ring may be the same.

A rotational displacement of the low cam ring may be controlled by a control portion.

The control portion may be connected to the hydraulic pump and controls a rotational displacement of the low cam ring by oil pressure supplied from the hydraulic pump, wherein the control portion includes a hydraulic cylinder actuated by the oil pressure, and wherein the control portion further includes, a gear formed on an outer peripheral surface of the lower cam ring, wherein the hydraulic cylinder includes, a piston rod slidably received in a housing and having a rack gear engaging with the gear of the lower cam ring, a spring seat having a hole and disposed in the housing to form an inner chamber therein, a hydraulic piston disposed in the inner chamber and integrally connected to the piston rod through the hole of the spring seat so as to move forwards and backwards according to the oil pressure supplied from the hydraulic pump, and a spring disposed between the spring seat and the hydraulic piston in the inner chamber and elastically supporting the hydraulic piston.

At least two bypass paths may be formed at one side of the hydraulic cylinder between the spring seat and one end portion of the housing with a predetermined interval therebetween in a longitudinal direction of the housing to drain oil in the inner chamber, and an influx hole may be formed at the one portion of the hydraulic cylinder to receive the oil pressure supplied from the hydraulic pump.

The predetermined interval of the at least two bypass paths may be equal to or larger than a thickness of the hydraulic piston.

In a flow rate control device of a hydraulic pump in a power steering system according to various aspects of the present invention, as the vehicle is driven at high speed and the rotation speed of the engine increases, the rotation speed of the hydraulic pump also increases, and thus a flow rate and oil pressure discharged from the hydraulic pump increases. At this time, a part of the flow rate discharged from the hydraulic pump is feed-backed, such that a hydraulic piston is actuated, thereby rotating a cam ring. As the cam ring rotates, a cam profile of the cam ring is changed and an oil pressing space between a rotor and the cam ring is reduced, thereby automatically decreasing a flow rate and pressure of oil generated by changing a volume in the oil pressing space. As a result, the oil pressure and the flow rate of oil discharged from the hydraulic pump and supplied to the power steering system automatically decrease, such that handling assisting power of a steering handle is reduced, thereby improving the handling stability of the steering handle. Further, the temperature of operation oil of the hydraulic pump of the power steering system decreases and thus it is not necessary to install an additional oil cooler, thereby decreasing a weight of the vehicle and saving the manufacturing cost of vehicle. It is possible to improve a layout by reducing a length and a diameter of an oil return hose that guides the oil to the hydraulic pump and it is possible to save development cost and shorten a development period by properly adjusting the rigidity of a spring that flexibly supports the hydraulic piston to facilitate tuning of the hydraulic pump. Therefore, it is possible to reduce the weight of the vehicle, save the manufacturing cost, and improve NVH performance by a simpler structure than the variable capacity type hydraulic pump, and to improve fuel ratio by enhancing deterioration of the fuel ratio of the engine, which is caused due to driving of the hydraulic pump.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
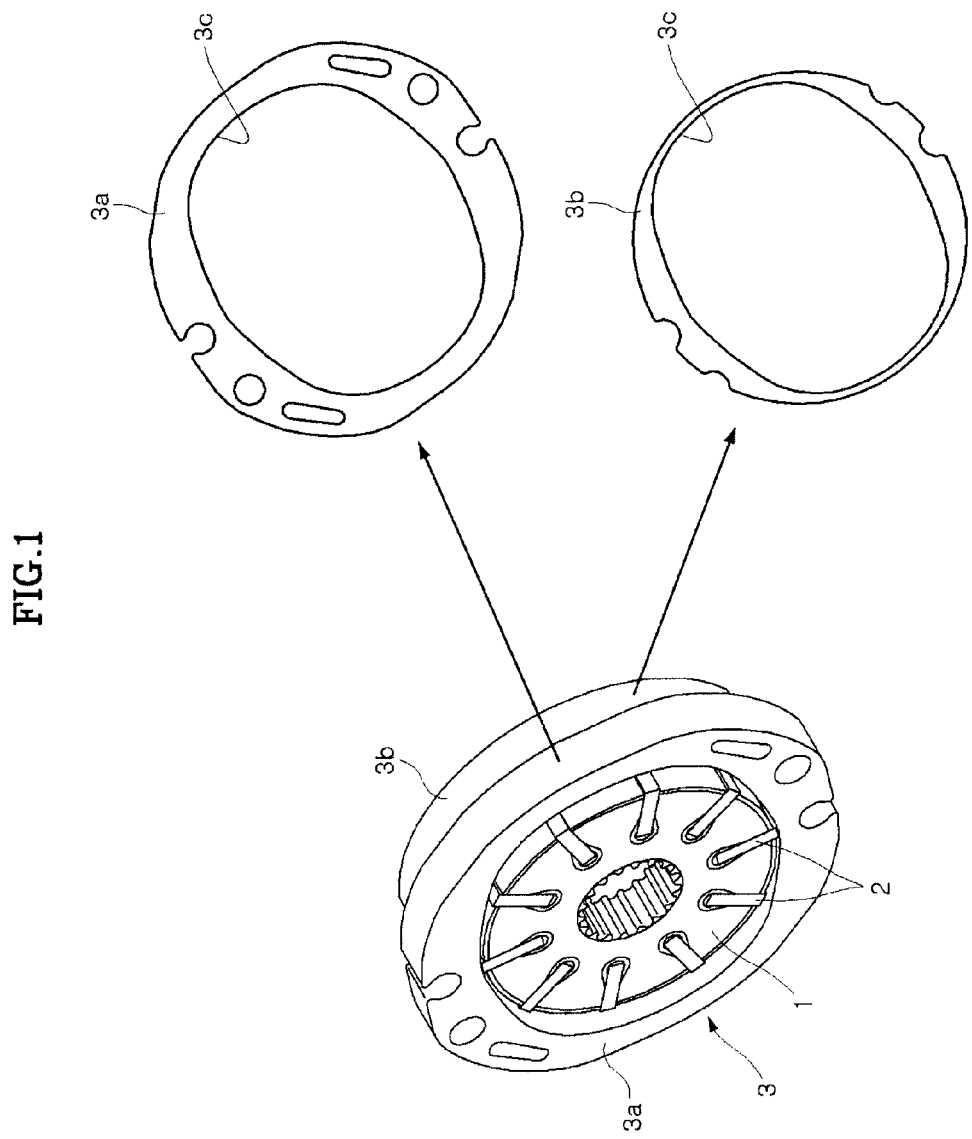
FIG. 1 is a perspective view of assembly and disassembly of a cam ring and a rotor according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a perspective view of main components of a hydraulic pump in a power steering system according to an exemplary embodiment of the present invention. That is, a plurality of vanes 2 are inserted in a circular rotor 1 that is rotatably installed by receiving rotation force of an engine at a predetermined interval in a circumferential direction and each of vanes 2 is mounted on a rotor 1 to project in a radial direction by receiving centrifugal force by rotation of rotor 1.

A cam ring 3 covers the outer periphery of rotor 1. Cam ring 3 includes an upper cam ring 3a fixedly installed in a hydraulic pump housing and a lower cam ring 3b rotatably installed in a circumferential direction by a control device described below. The same cam profile 3c is formed in each of upper cam ring 3a and lower cam ring 3b. Rotor 1 is inserted and rotatably installed in cam profile 3c.

Thus, an oil pressing space 4 is formed between the inner peripheral surface of cam profile 3c and the outer peripheral surface of rotor 1.

Figure 2:
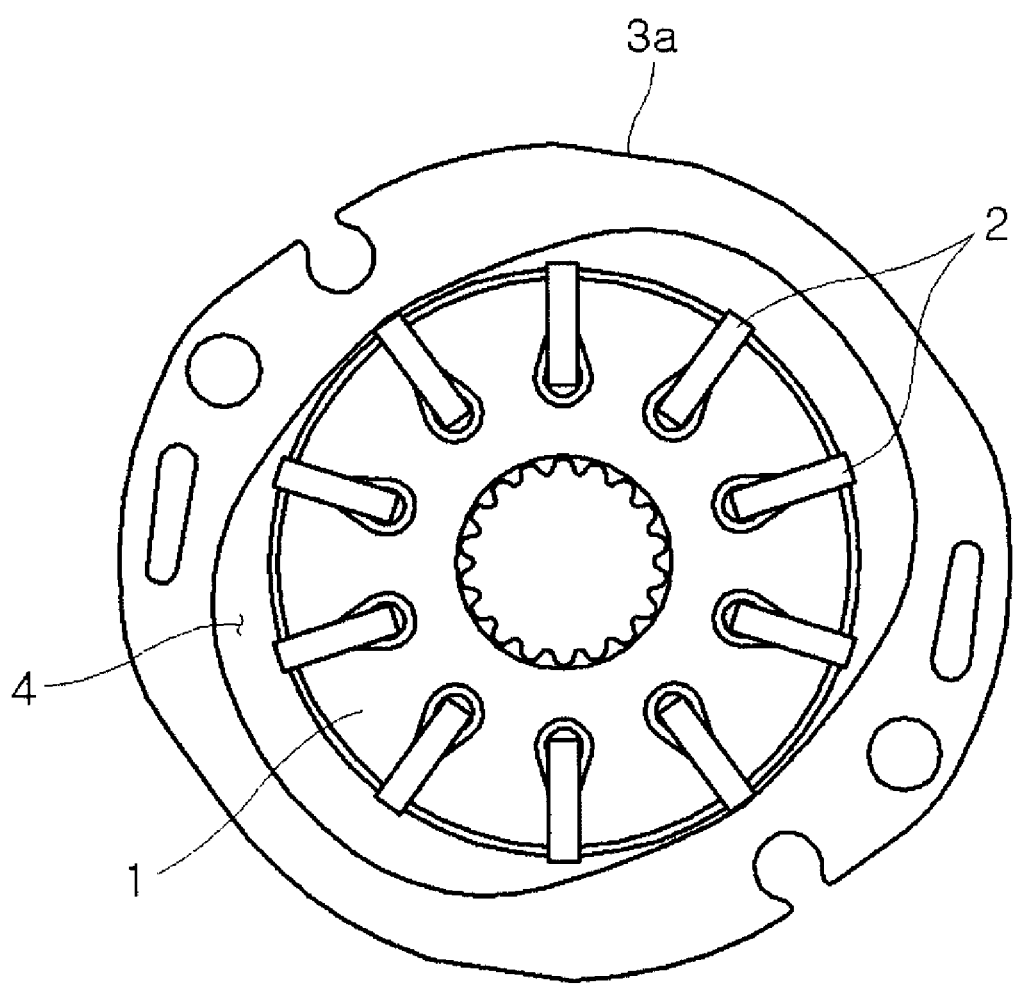
FIGS. 2 to 5 are diagrams illustrating a phase shift in which a cam ring varies in accordance with the rotation speed of an engine according to an embodiment of the present invention.

FIG. 2 illustrates an operation in which the hydraulic pump with rotor 1 and cam ring 3 pressurizes and discharges oil according to an exemplary embodiment of the present invention. Lower cam ring 3b has the same phase as upper cam ring 3a in driving the hydraulic pump at an initial stage. When the rotation speed of the engine gradually increases, lower cam ring 3b rotates by the control device, such that a phase of lower cam ring 3b is shifted with respect to upper cam ring 3a.

Figure 3:
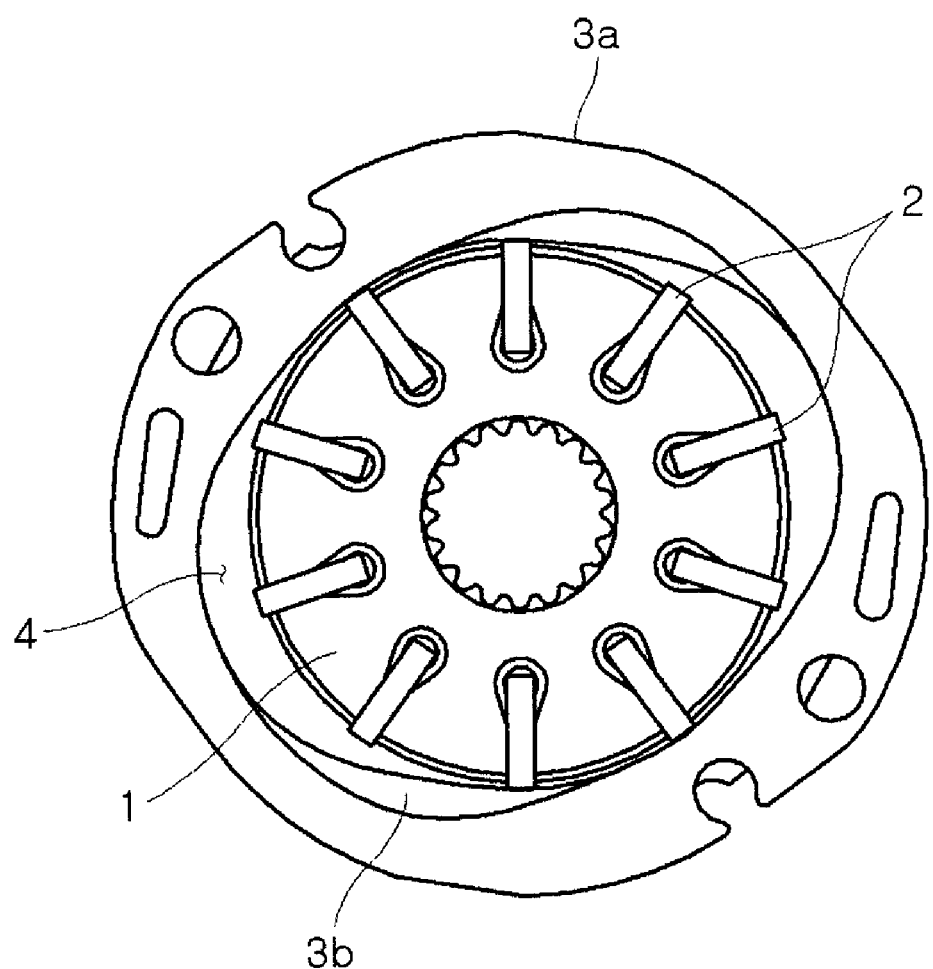

FIG. 3 illustrates a state in which a phase of lower cam ring 3b is shifted by 30 degrees with respect to upper cam ring 3a. When the phase of lower cam ring 3b is shifted with respect to upper cam ring 3a, a cam profile of upper cam ring 3a and a cam profile of lower cam ring 3b are distorted. As a result, the oil pressing space is reduced. In this state, although the oil pressurized and discharged by projecting vane 2 in a radial direction through rotating the rotor, a discharged flow rate decreases as much in comparison with the state shown in FIG. 2.

Figure 4:
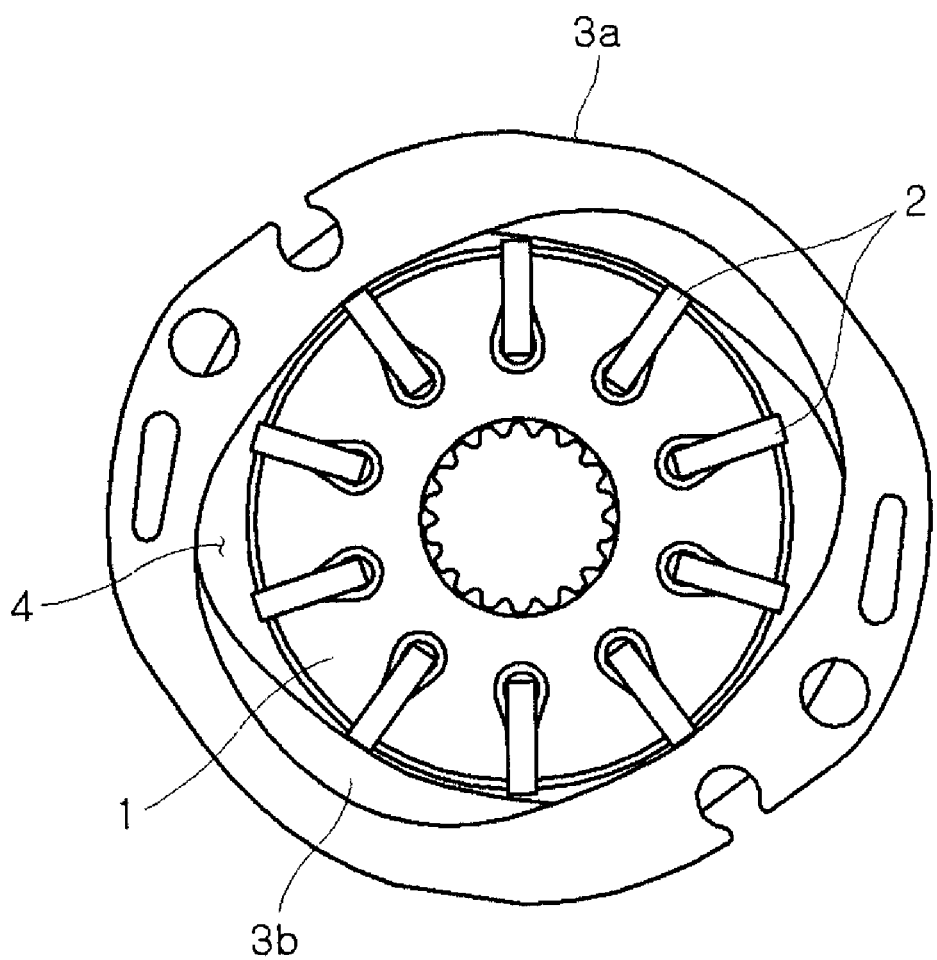

When the rotation speed of the engine continuously increases, the phase of lower cam ring 3b is shifted with respect to upper cam ring 3a in proportion thereto. FIG. 4 illustrates a case in which the phase of lower cam ring 3b is shifted with respect to upper cam ring 3a by 60 degrees. In this case, as the size of the oil pressing space is further reduced, a flow rate and oil pressure discharged from the hydraulic pump decrease in inverse proportion thereto.

Meanwhile, in the case when the vehicle is driven at high speed, lower cam ring 3b rotates at 90 degrees by the control device, thereby shifting lower cam ring 3b with respect to upper cam ring 3a by 90 degrees. Therefore, the oil pressing space is reduced to the maximum. As a result, although rotor 1 rotates at high speed, each of vanes 2 does not almost project, thereby reducing the flow rate and the oil pressure discharged from the hydraulic pump to the minimum.

Accordingly, in the case when the engine is operated at high speed, the least flow rate is discharged from the hydraulic pump and is supplied to the power steering system. Therefore, the handling assisting force of a steering handle is reduced, thus, a user's handle operation feeling becomes heavier as much, thereby improving handling stability and as the hydraulic pump almost idles, the fuel ratio of the engine is improved as much.

That is, in the present invention, the flow rate and the oil pressure discharged from the hydraulic pump are reduced in inverse proportion to the rotation speed of the engine.

Figure 6:
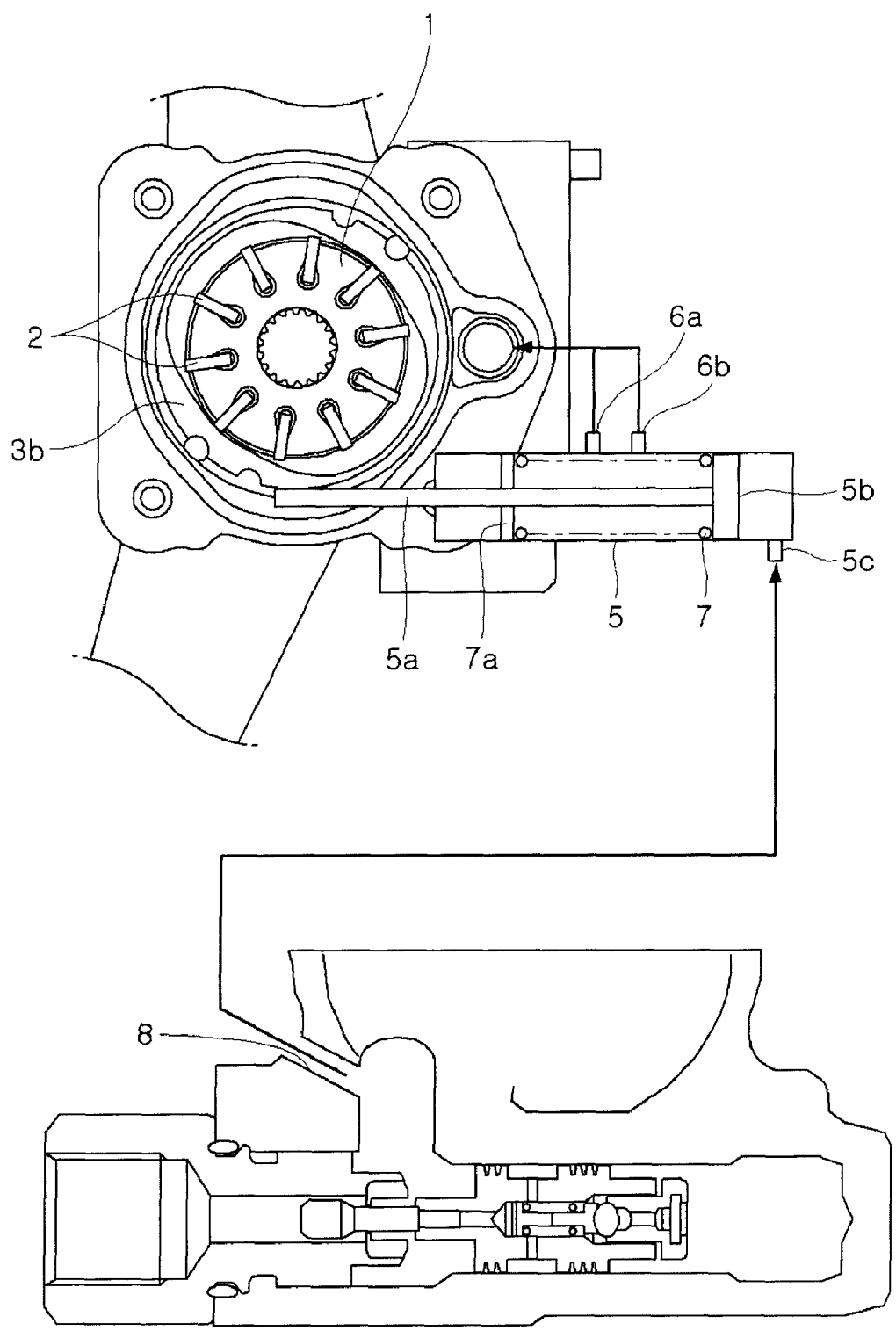
FIG. 6 is a diagram illustrating the configuration of a control device of a lower cam ring according to an embodiment of the present invention.

FIG. 6 illustrates the configuration of the control device that allows lower cam ring 3b to rotate in proportion to the rotation speed of the engine. A cylindrical gear is formed on the outer peripheral surface of lower cam ring 3b, a rack gear engaging with the cylindrical gear is formed on a piston rod 5a of a hydraulic cylinder 5, and piston rod 5a is connected to hydraulic piston 5b that is installed in hydraulic cylinder 5 to be movable forward and backward.

Two bypass paths 6a and 6b are arranged in parallel in an axial direction at one side of hydraulic cylinder 5 on the basis of hydraulic piston 5b. Hydraulic piston 5b is flexibly supported via a spring 7 in hydraulic cylinder 5. One end of spring 7 is pressed and supported by a spring sheet 7a that is fixedly attached to the inside of hydraulic cylinder 5, while the other end of spring 7 is seated on hydraulic piston 5b to flexibly support hydraulic piston 5b.

An influx hole 5c in which the oil flows is formed at the other side of hydraulic cylinder 5 on the basis of hydraulic piston 5b. Oil influx hole 5c is connected to an oil discharge hole 8 of the hydraulic pump to receive the oil.

Bypass paths 6a and 6b are connected to an oil influx side of the hydraulic pump. At this time, when the bypass paths 6a and 6b are under predetermined pressure or higher, bypass paths 6a and 6b are opened, whereby the oil in hydraulic cylinder 5 flows in the oil influx side.

Figure 7:
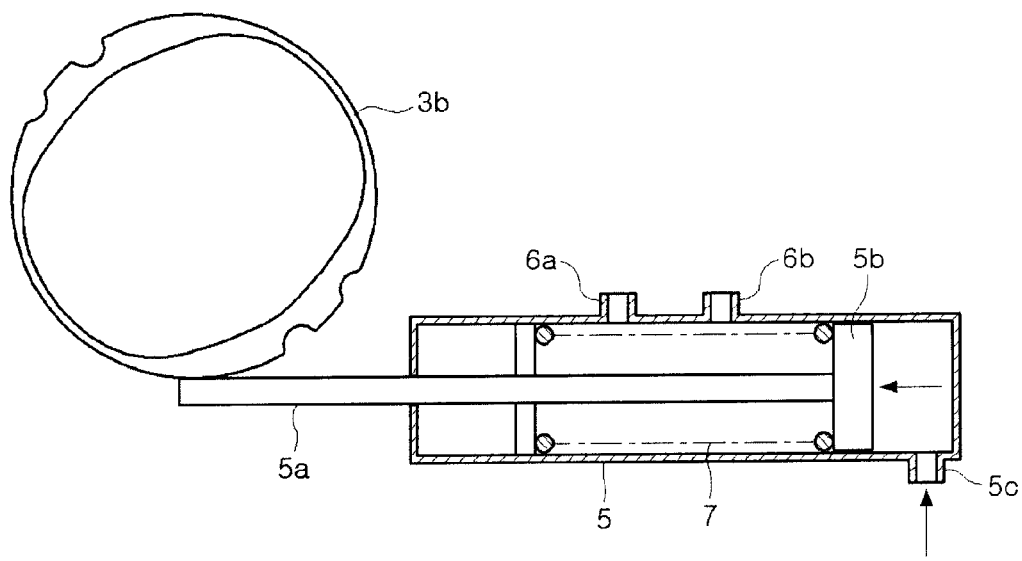
FIGS. 7 and 8 are diagrams illustrating an operation of a control device of a lower cam ring according to an embodiment of the present invention.
Figure 8:
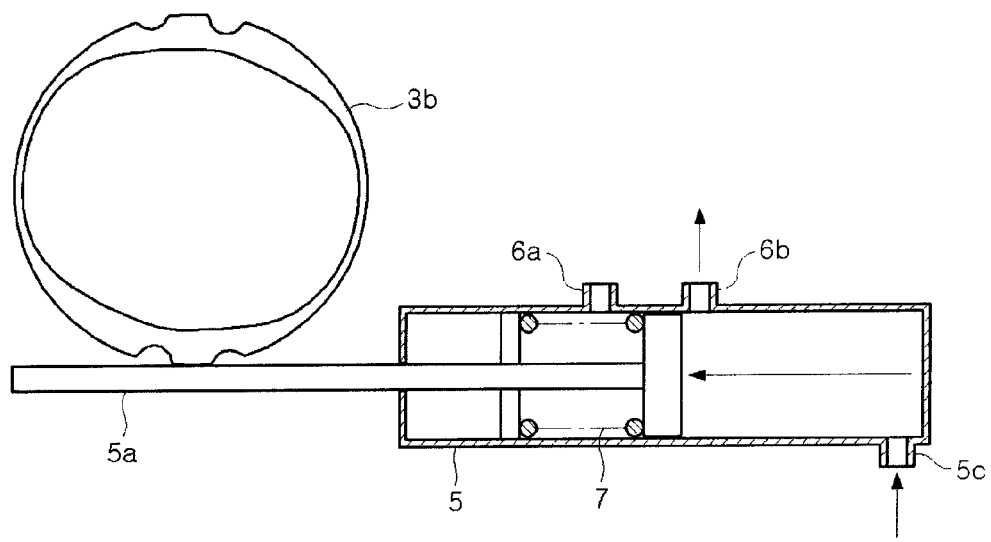

FIGS. 7 and 8 illustrate an operation of the control device of lower cam ring 3b according to an exemplary embodiment of the present invention. That is, when the hydraulic pump is driven by receiving the rotation power of the engine, the flow rate discharged from the hydraulic pump is supplied to the power steering system, thereby assisting the handling power of a driver's steering handle.

A part of the flow rate discharged from discharge hole 8 of the hydraulic pump is supplied to hydraulic cylinder through the oil influx hole 5c of hydraulic cylinder 5.

As a result, the pressure of the supplied oil actuates on one side of hydraulic piston 5b, while the elastic resistance force of spring 7 and the resistance force of the oil act on the other side of hydraulic piston 5b in combination. In the case when the pressure of the oil discharged and supplied from the hydraulic pump is high, hydraulic piston 5b moves forward while compressing spring 7 and piston rod 5a moves forward by the forward movement of hydraulic piston 5b, thereby rotating lower cam ring 3b. As hydraulic piston 5b moves forward, the oil charged at one side in hydraulic cylinder 5 is drained through two bypass paths 6a and 6b.

That is, until force actuating on both sides of hydraulic piston 5b keeps a balance, lower cam ring 3b rotates by a forward stroke of hydraulic piston 5b while hydraulic piston 5b moves forward.

When the hydraulic pump is operated at high speed, and the flow rate and the oil pressure discharged from the hydraulic pump increase, hydraulic piston 5b further moves forward by the raised oil pressure as shown in FIG. 8.

Figure 5:
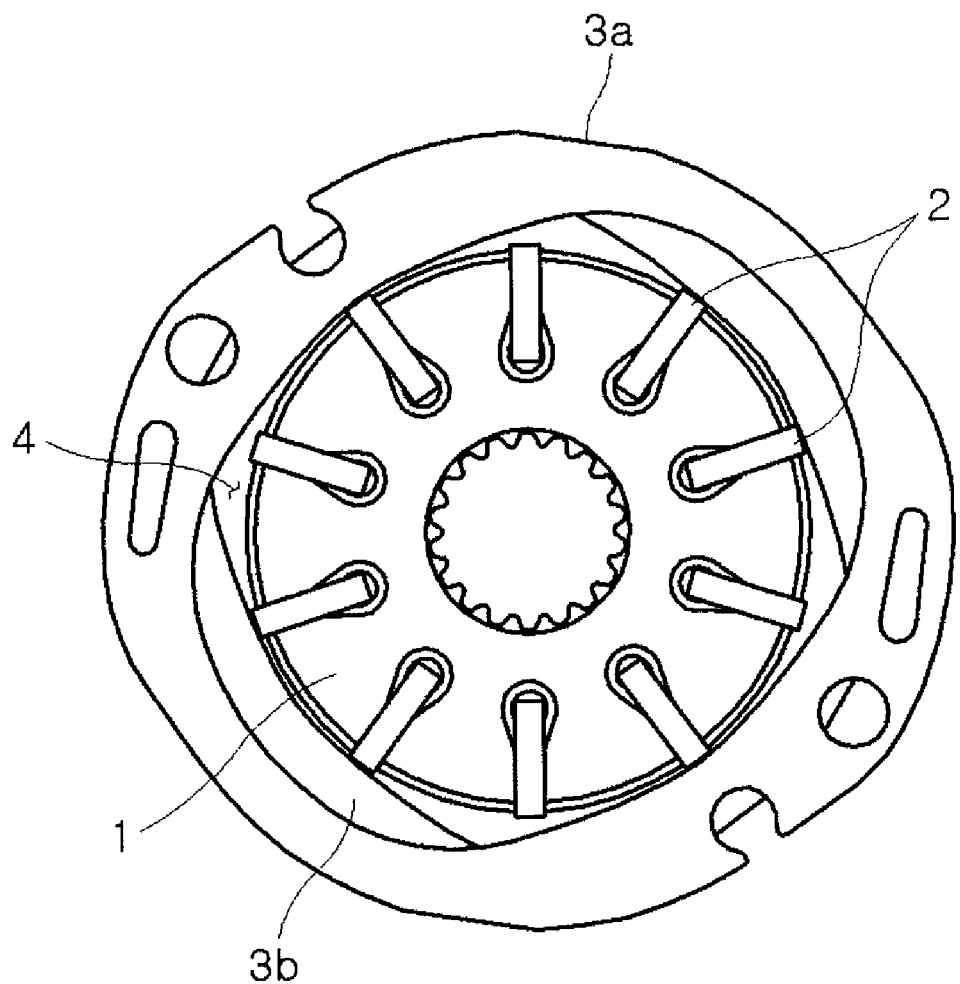

At this time, when hydraulic piston 5b passes over bypass path 6b, the oil in hydraulic cylinder 5 is discharged through only one bypass path 6a, while a part of the flow rate supplied from the hydraulic pump through oil influx hole 5c is supplied in front of the hydraulic piston 5b through the bypass path 6a. In this case, the same pressure actuates on both sides of hydraulic piston 5b to stop the forward movement of hydraulic piston 5b and upper cam ring 3a rotates to the maximum (at 90 degrees in this exemplary embodiment of the present invention), such that the phase of lower cam ring 3b is shifted with respect to upper cam ring 3a to the maximum as shown in FIG. 5, thereby reducing the flow rate and oil pressure discharged from the hydraulic pump to the minimum.

It is possible to easily tune the rotation speed of the engine at which lower cam ring 3b starts to rotate and a rotation angle of lower cam ring 3b by properly adjusting an elasticity modulus of spring 7 and positions of bypass paths 6a and 6b.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A flow rate control device of a hydraulic pump in a power steering system, comprising:
    an upper cam ring having a cam profile, which is fixedly installed;
    a lower cam ring having a cam profile, which is engaged with the upper cam ring to be relatively rotatable about the upper cam ring; and
    a rotor including a plurality of vanes and engaged with the upper and lower cam rings to form an inner space therebetween to pressurize oil by protruding the vanes in the inner space by centrifugal force while rotating,
    wherein a rotational displacement of the low cam ring is controlled by a control portion,
    wherein the control portion is connected to the hydraulic pump and controls a rotational displacement of the low cam ring by oil pressure supplied from the hydraulic pump,
    wherein the control portion includes a hydraulic cylinder actuated by the oil pressure,
    wherein the control portion further includes a gear formed on an outer peripheral surface of the lower cam ring,
    wherein the hydraulic cylinder includes:
        a piston rod slidably received in a housing and having a rack gear engaging with the gear of the lower cam ring;
        a spring seat having a hole and disposed in the housing to form an inner chamber Therein;
        a hydraulic piston disposed in the inner chamber and integrally connected to the piston rod through the hole of the spring seat so as to move forwards and backwards in the inner chamber according to the oil pressure supplied from the hydraulic pump; and
        a spring disposed between the spring seat and the hydraulic piston in the inner chamber and elastically supporting the hydraulic piston, and
    wherein at least two bypass paths are formed at one side of the hydraulic cylinder between the spring seat and one end portion of the housing with a predetermined interval therebetween in a longitudinal direction of the housing to drain oil in the inner chamber, and an influx hole are formed at the one end portion of the hydraulic cylinder to receive the oil pressure supplied from the hydraulic pump.

2. The flow rate control device as defined in claim 1, wherein the predetermined interval of the at least two bypass paths is equal to or larger than a thickness of the hydraulic piston.

3. The flow rate control device as defined in claim 1, wherein the cam profiles of the upper cam ring and the lower cam ring are the same.

* * * * *